United States Patent [19]
Jakubowski

[11] Patent Number: 6,081,258
[45] Date of Patent: Jun. 27, 2000

[54] TWIN MOUSE DIGITIZER

[76] Inventor: Marek Jakubowski, 7030 Roaring Fork, Boulder, Colo. 80301

[21] Appl. No.: 09/004,223

[22] Filed: Jan. 8, 1998

[51] Int. Cl.[7] .................................................. G09G 5/08
[52] U.S. Cl. .......................................... 345/163; 345/157
[58] Field of Search .................... 345/157, 163, 345/164, 165, 166, 167

[56] References Cited

U.S. PATENT DOCUMENTS

| | | | |
|---|---|---|---|
| 4,891,632 | 1/1990 | Chang | 340/709 |
| 5,162,781 | 11/1992 | Cambrigde | 340/10 |
| 5,355,146 | 10/1994 | Chiu et al. | 345/156 |
| 5,670,990 | 9/1997 | Bidiville et al. | 345/164 |
| 5,701,175 | 12/1997 | Kostizak et al. | 356/326 |
| 5,771,038 | 6/1998 | Wang | 345/163 |
| 5,850,210 | 12/1998 | Wu | 345/157 |
| 5,912,660 | 6/1999 | Gouzman et al. | 345/163 |

*Primary Examiner*—Vijay Shankar
*Assistant Examiner*—Vanel Frenel

[57] ABSTRACT

A twin mouse digitizer is provided including a mouse housing with at least one button situated thereon. A first movement tracing mechanism is situated on a bottom face of the housing for generating a first movement signal. Associated therewith is a second movement tracing mechanism situated on the bottom face of the housing for generating a second movement signal. As such, an angular orientation of the housing may be ascertained from the movement signals of the first and second movement tracing mechanism.

5 Claims, 2 Drawing Sheets

TWIN MOUSE DIGITIZER

BACKGROUND OF THE INVENTION

1. Field of the Invention

The present invention relates to computer mousses and more particularly pertains to a new twin mouse digitizer for ascertaining an angular orientation of a mouse housing.

2. Description of the Prior Art

The use of computer mousses is known in the prior art. More specifically, computer mousses heretofore devised and utilized arc known to consist basically of familiar, expected and obvious structural configurations, notwithstanding the myriad of designs encompassed by the crowded prior art which have been developed for the fulfillment of countless objectives and requirements.

Known prior art computer mousses include U.S. Pat. No. 4,886,941; U.S. Pat. No. 5,280,276; U.S. Pat. Des. 354,746; U.S. Pat. No. 4,797,665; U.S. Pat. No. 4,780,707; and U.S. Pat. No. 4,521,772.

In these respects, the twin mouse digitizer according to the present invention substantially departs from the conventional concepts and designs of the prior art, and in so doing provides an apparatus primarily developed for the purpose of ascertaining an angular orientation of a mouse housing.

SUMMARY OF THE INVENTION

In view of the foregoing disadvantages inherent in the known types of computer mousses now present in the prior art, the present invention provides a new twin mouse digitizer construction wherein the same can be utilized for ascertaining an angular orientation of a mouse housing.

The general purpose of the present invention, which will be described subsequently in greater detail, is to provide a new twin mouse digitizer apparatus and method which has many of the advantages of the computer mousses mentioned heretofore and many novel features that result in a new twin mouse digitizer which is not anticipated, rendered obvious, suggested, or even implied by any of the prior art computer mousses, either alone or in any combination thereof.

To attain this, the present invention generally comprises a housing with a generally rectangular configuration having a top face, a bottom face, a rear face, a front face and a pair of side faces defining an interior space. The top face has a rear planar extent and a front beveled extent. As shown in the Figures, an edge between the rear face and the top face is arcuate along a length thereof. The bottom face has a pair of identical circular apertures formed therein, as shown in FIG. 2. Centers of the circle apertures define a line that remains perpendicular with the side faces. The interior space defines a pair of tracing ball cavities. FIGS. 1, 3, 4 show a plurality of push buttons situated on the front beveled extent of the housing. Such buttons each have a rectangular top face. Each button is pivotally mounted adjacent an interconnection of the front and rear extents of the top face. As best shown in FIG. 4, the buttons remain generally in coplanar relationship with the rear extent of the top face. Next provided is a pair of tracing balls each rotatably situated within a corresponding one of the cavities of the housing and protruding through the associated circular aperture of the housing. The tracing balls include a first tracing ball and a second tracing ball. A first tracing ball movement detector is provided including a first roller rotatably coupled within the interior space of the housing. The first roller is situated about an axis which remains perpendicular with the front and rear face of the housing. The first roller is in constant abutment with the first tracing ball for rotating during X-plane movement of the first tracing ball. The first roller serves to generate an X-signal indicative of such movement. The first tracing ball movement detector further includes a second roller rotatably coupled within the interior space of the housing about an axis which remains perpendicular with the side faces of the housing. The second roller is in constant abutment with the first tracing ball for rotating during Y-plane movement of the first tracing ball and generating a Y-signal indicative of the same. Finally, a second tracing ball movement detector is provided including only one roller rotatably coupled within the interior space of the housing. The roller of the second tracing ball movement detector is situated about an axis which remains perpendicular with the side faces of the housing. The roller of the second tracing ball movement detector remains in constant abutment with the second tracing ball for rotating during Y-plane movement of the second tracing ball and generating a Y-signal indicative of the same. By this structure, the angular orientation of the housing may be ascertained from the signals of the first and second tracing ball movement detectors.

The present invention is thus a modified mouse that would utilize two tracing balls for its operation. When in use, the X and Y pulses from one tracing ball would be used to indicate the movement of the device with respect to a drawing. The Y pulses from the second ball would be used to determine the angular orientation of the device. The pulse counts from the X-Y ball emitter and second Y ball emitter are fed to the computer at a reasonable sampling frequency (of the order of 10 to 20 readings per second). A companion software driver program would use the difference in the "Y" counts of the two ball emitters to calculate the change in the angular orientation of the device to the desired degree of accuracy. The incremental change in the angle would be accumulated to yield the angle between the device axis and the drawing axis at all times for the motion of the devise. This angle would be used to calculate the position of the device relative to the coordinate axis of the drawing, using the coordinate transformation due to rotation. In this way, the true digitized position of the X-Y emitting ball would be known at all times.

When a point to be digitized is reached by positioning the cross-hair over the point, the operator would depress one of the buttons on the device to signal the computer to record the coordinates of the point. These coordinates would be corrected for the geometry of the device: i.e., the relative position of the crosshair to the emitting ball. The digitizing operation would be started by positioning the device over a reference point on the drawing and aligning it with the drawing axis and then pressing a second button. The computer program would then initialize all variables to the desired values.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new twin mouse digitizer apparatus and method which has many of the advantages of the computer mousses mentioned heretofore and many novel features that result in a new twin mouse digitizer which is not anticipated, rendered obvious, suggested, or even implied by any of the prior art computer mousses, either alone or in any combination thereof.

It is another object of the present invention to provide a new twin mouse digitizer which may be easily and efficiently manufactured and marketed.

It is a further object of the present invention to provide a new twin mouse digitizer which is of a durable and reliable construction.

An even further object of the present invention is to provide a new twin mouse digitizer which is susceptible of a low cost of manufacture with regard to both materials and labor, and which accordingly is then susceptible of low prices of sale to the consuming public, thereby making such twin mouse digitizer economically available to the buying public.

Still yet another object of the present invention is to provide a new twin mouse digitizer which provides in the apparatuses and methods of the prior art some of the advantages thereof, while simultaneously overcoming some of the disadvantages normally associated therewith.

Still another object of the present invention is to provide a new twin mouse digitizer for ascertaining an angular orientation of a mouse housing.

Even still another object of the present invention is to provide a new twin mouse digitizer that includes a mouse housing with at least one button situated thereon. A first movement tracing mechanism is situated on a bottom face of the housing for generating a first movement signal. Associated therewith is a second movement tracing mechanism situated on the bottom face of the housing for generating a second movement signal. As such, an angular orientation of the housing may be ascertained from the movement signals of the first and second movement tracing mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
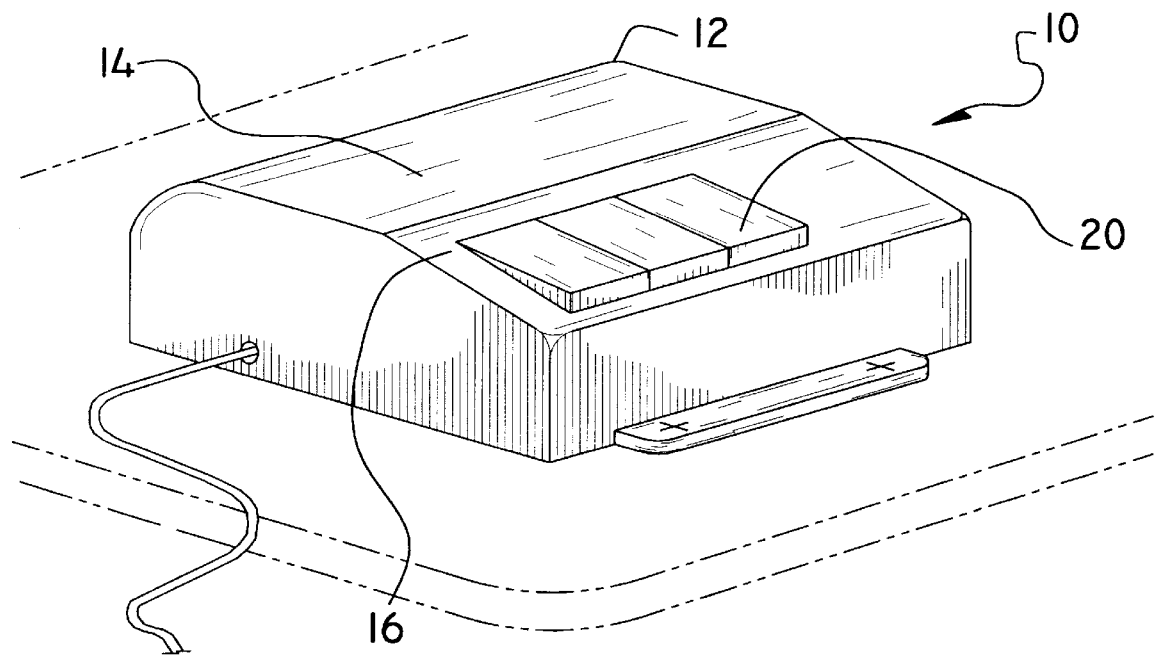
FIG. 1 is a perspective view of a new twin mouse digitizer according to the present invention.

With reference now to the drawings, and in particular to FIGS. 1 through 5 thereof, a new twin mouse digitizer embodying the principles and concepts of the present invention and generally designated by the reference numeral 10 will be described.

Figure 2:
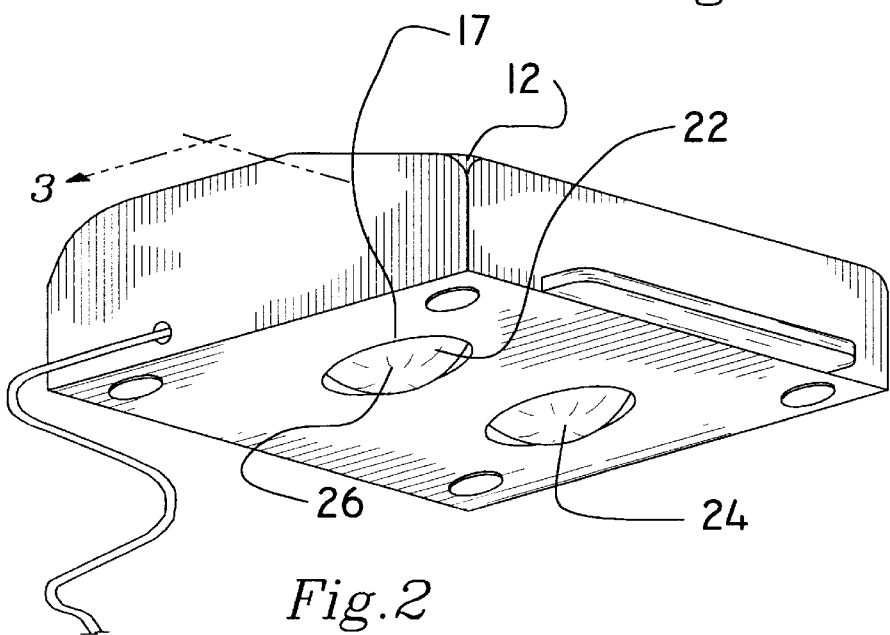
FIG. 2 is a perspective view of the lower surface of the present invention.

The present invention, as designated as numeral 10, includes a housing 12 with a generally rectangular configuration having a top face, a bottom face, a rear face, a front face and a pair of side faces defining an interior space. The top face has a rear planar extent 14 and a front beveled extent 16. As shown in the Figures, an edge between the rear face and the top face is arcuate along a length thereof. The bottom face has a pair of identical circular apertures 17 formed therein, as shown in FIG. 2. Centers of the circle apertures define a line that remains perpendicular with the side faces. Further, the interior space of the housing defines a pair of tracing ball cavities.

Figure 3:
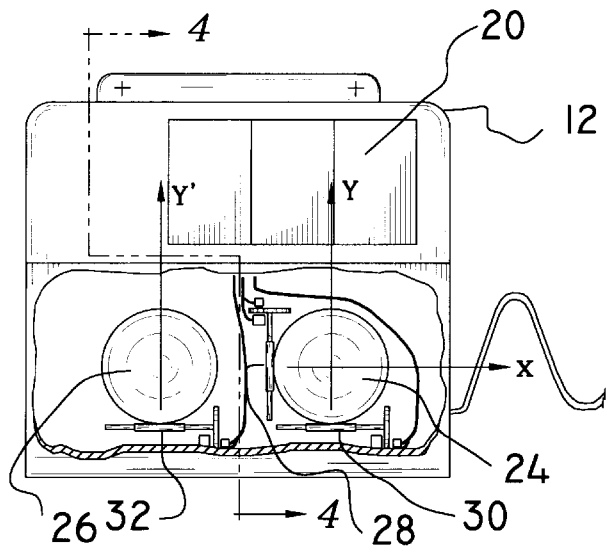
FIG. 3 is a top sectional view of the present invention.
Figure 4:
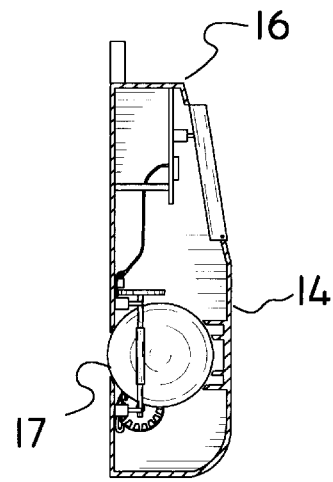
FIG. 4 is a cross-section view of the present invention taken along line 4—4 shown in FIG. 3.
Figure 5:
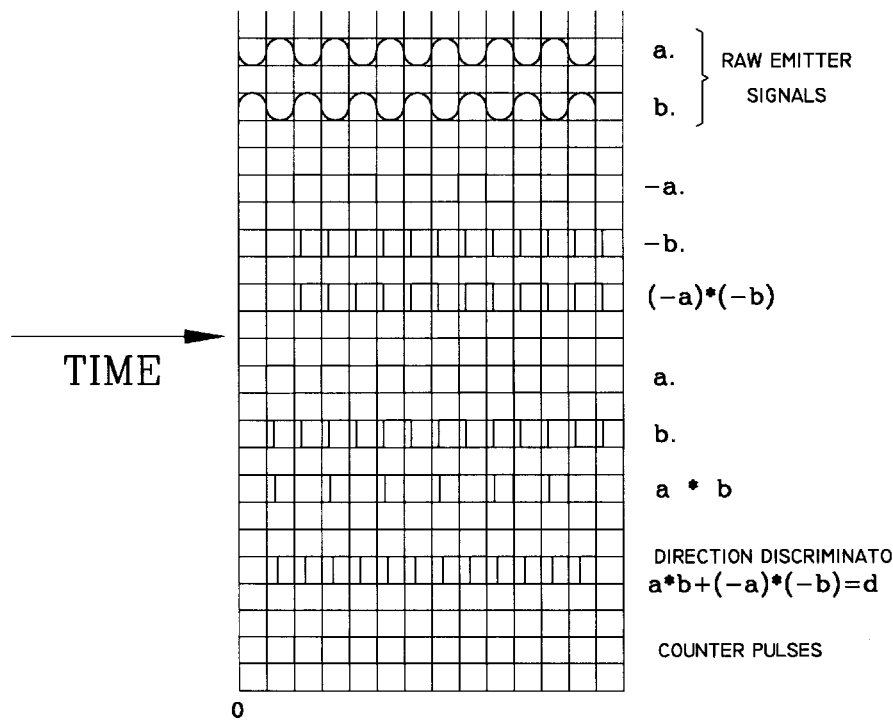
FIG. 5 is a graph of the signals generated by the tracing ball movement detectors of the present invention.

FIGS. 1, 3, 4 show a plurality of push buttons 20 situated on the front beveled extent of the housing. Such buttons each have a rectangular top face. Each button is pivotally mounted adjacent an interconnection of the front and rear extents of the top face. As best shown in FIG. 4, the buttons remain generally in coplanar relationship with the rear extent of the top face.

Next provided is a pair of tracing balls 22 each rotatably situated within a corresponding one of the cavities of the housing and protruding through the associated circular aperture. The tracing balls include a first tracing ball 24 and a second tracing ball 26.

A first tracing ball movement detector is provided including a first roller 28 rotatably coupled within the interior space of the housing. The first roller is situated about an axis which remains perpendicular with the front and rear face of the housing. The first roller is in constant abutment with the first tracing ball for rotating during X-plane movement of the first tracing ball. The first roller serves to generate an X-signal indicative of such movement.

The first tracing ball movement detector further includes a second roller 30 rotatably coupled within the interior space of the housing about an axis which remains perpendicular with the side faces of the housing. The second roller is in constant abutment with the first tracing ball for rotating during Y-plane movement of the first tracing ball and generating a Y-signal indicative of the same.

Finally, a second tracing ball movement detector is provided including only one roller 32 rotatably coupled within the interior space of the housing. The roller of the second tracing ball movement detector is situated about an axis which remains perpendicular with the side faces of the housing. The roller of the second tracing ball movement detector remains in constant abutment with the second tracing ball for rotating during Y-plane movement of the second tracing ball and generating a Y-signal indicative of the same. It should be noted that the rollers of the movement detectors may include any one of a plurality of known means of converting mechanical motion to an electrical signal.

By this structure, the angular orientation of the housing may be ascertained from the signals of the first and second tracing ball movement detectors. Further details relating to the method of which this is accomplished is as follows.

Preferably, all of the functions of the control are embedded in a control program. No special ports or connectors on the computer are required. An interface circuit is connected to the computer's serial communication port via a standard serial communication cable. The digitizer operation is started by invoking the execution of the digitizer program. The program then requests the inputs from the operator specifying the general size of a drawing to be digitized, the drawing scale e.g. 1"=xx feet, the relative x,y position of the starting point, and the number of the serial port connected to the digitizer.

The program then initializes the communication port to the parameters matching the digitizer interface circuit and checks its status. If the digitizer is powered-up and cables are connected properly a message: "Digitizer READY" is displayed on the operators monitor and the digitizing operation can be started. Following the initialization the program sends commands and reads responses of the digitizer. The commands sent to the digitizer consist of one Byte (8 bits) each. These are sent in the following order:

1. " " or hexadecimal "20". Transfer counters respective binary "00100000" registers and reset counters.
2. "A" or hexadecimal "41". Enable X register outputs and binary "01000010" start transmission.
3. "B" or hexadecimal "42". Enable Y register outputs and binary "01000100" start transmission.
4. "D" or hexadecimal "44". Enable Y' register outputs and binary "010000100" start transmission.
5. "H" or hexadecimal "48". Enable the switch register and binary "01001000" start transmission.

The register outputs are all Tri-State and connected to the eight parallel input pins of the UART IC used as a communication interface between the computer and the digitizer. The data transmission is started by pulsing and DATA STROBE pin of the UART.

Various values of the command Bytes can be used, the above values were chosen to simplify the command decoding. Thus "1" in bit 6 position of the command instructs the interface circuit to save the values of the binary counters by transferring their contents to the respective registers ad then reset the counter. If this operation coincides with an emitter pulse arrival the operation is delayed to allow the pulse to be counted and the counter to stabilize. The bit 6 is a "0" in all other commands. Since the other commands request a transmission of a response they have bit 7 set to "1" and one of the low end 4 bit indicates the register to be transmitted. Thus bit 7 and bit 1 causes the X register output to be enabled thus putting the X pulse count on the UART input for transmission. A delay of approximately 2 microseconds allows the values to stabilize and triggers the DATA STROBE of the UART thus initializing the transmission. Each transmission consists of one 8 bit byte only.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A twin mouse digitizer comprising, in combination:

a housing with a generally rectangular configuration having a top face, a bottom face, a rear face, a front face and a pair of side faces defining an interior space, the top face having a rear planar extent and a front beveled extent, an edge between the rear face and the top face between arcuate along a length thereof, the bottom face having a pair of identical circular apertures formed therein with centers which define a line that remains perpendicular with the side faces, the interior space defining a pair of tracing ball cavities;

a plurality of push buttons situated on the front beveled extent of the housing and having a rectangular top face, each button pivotally mounted adjacent an interconnection of the front and rear extents of the top face and further remaining generally in coplanar relationship with the rear extent of the top face;

a pair of tracing balls each rotatably situated within a corresponding one of the cavities of the housing and protruding through the associated circular aperture of the housing, the tracing balls including a first tracing ball and a second tracing ball;

a first tracing ball movement detector including a first roller rotatably coupled within the interior space of the housing about an axis which remains perpendicular with the front and rear face of the housing, the first roller being in constant abutment with the first tracing ball for rotating during X-plane movement of the first tracing ball and generating an X-signal indicative of the same, the first tracing ball movement detector further including a second roller rotatably coupled within the interior space of the housing about an axis which remains perpendicular with the side faces of the housing, the second roller being in constant abutment with the first tracing ball for rotating during Y-plane movement of the first tracing ball and generating a Y-signal indicative of the same; and a second tracing ball movement detector including only one roller rotatably coupled within the interior space of the housing about an axis which remains perpendicular with the side faces of the housing, the roller of the second tracing ball movement detector being in constant abutment with the second tracing ball for rotating during Y-plane movement of the second tracing ball and generating a Y-signal indicative of the same;

whereby the angular orientation of the housing may be ascertained from the signals of the first and second tracing ball movement detectors; and a pointer plate centrally coupled to the front face of the housing and proximate the bottom face of the housing, the pointer plate having a primary crosshair and a secondary crosshair for facilitating the selection of desired points, the primary crosshair being aligned with the first tracing ball, the secondary crosshair being aligned the second tracing ball such that a distance between the primary cross hair and the first tracing ball is equivalent to a distance between the secondary crosshair and the second tracing ball.

2. A twin mouse digitizer comprising:

a housing;

at least one button situated on the housing;

a first movement tracing means situated on a bottom face of the housing for generating a first movement signal; and a second movement tracing means situated on the bottom face of the housing and distanced from the first movement tracing means for generating a second movement signal;

whereby an angular orientation of the housing may be ascertained from the movement signals of the first and second movement tracing means; and a pointer plate centrally coupled to a front face of the housing and proximate a bottom face of the housing, the pointer plate having a primary crosshair and a secondary crosshair for facilitating the selection of desired points, the primary crosshair being aligned with the first tracing ball, the secondary crosshair being aligned the second tracing ball such that a distance between the primary cross hair and the first tracing ball is equivalent to a distance between the secondary crosshair and the second tracing ball.

3. A twin mouse digitizer as set forth in claim 2 wherein the movement tracing means each include a tracing ball and tracing ball movement detector.

4. A twin mouse digitizer as set forth in claim 2 wherein the tracing ball detectors each include at least one roller.

5. A twin mouse digitizer as set forth in claim 2 wherein the first movement tracing means is adapted to track both X-plane movement of the housing and generate an X-signal indicative of the same and further Y-plane movement of the housing and generate a Y-signal indicative of the same; and the second movement tracing mean is adapted to track Y-plane movement of the housing and generate a Y-signal indicative of the same.

* * * * *